(12) United States Patent
Gupta et al.

(10) Patent No.: US 10,983,836 B2
(45) Date of Patent: Apr. 20, 2021

(54) TRANSACTION OPTIMIZATION DURING PERIODS OF PEAK ACTIVITY

(71) Applicant: International Business Machines Corporation, Armonk, NY (US)

(72) Inventors: Lokesh M. Gupta, Tucson, AZ (US); Matthew G. Borlick, Tucson, AZ (US); John C. Elliott, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 16/102,621

(22) Filed: Aug. 13, 2018

(65) Prior Publication Data
US 2020/0051045 A1 Feb. 13, 2020

(51) Int. Cl.
*G06F 9/50* (2006.01)
*G06F 9/48* (2006.01)

(52) U.S. Cl.
CPC .......... *G06F 9/5077* (2013.01); *G06F 9/4887* (2013.01); *G06F 9/505* (2013.01)

(58) Field of Classification Search
CPC ...... G06F 9/5077; G06F 9/505; G06F 9/4887; G06F 9/466; H04L 47/10
See application file for complete search history.

(56) References Cited

U.S. PATENT DOCUMENTS

| | | | |
|---|---|---|---|
| 6,738,773 B1* | 5/2004 | Reunert | G06F 16/25 |
| 7,143,242 B2 | 11/2006 | Hill et al. | |
| 8,914,497 B1* | 12/2014 | Xiao | G06F 11/3452 |
| | | | 709/224 |
| 10,387,078 B1* | 8/2019 | Benisty | G06F 13/1689 |
| 10,455,379 B1* | 10/2019 | Martin | G06Q 30/01 |
| 2005/0182747 A1* | 8/2005 | Nakamoto | G06F 9/4881 |
| 2005/0265233 A1* | 12/2005 | Johnson | H04L 63/145 |
| | | | 370/229 |
| 2006/0236008 A1* | 10/2006 | Asano | G06F 13/42 |
| | | | 710/110 |

(Continued)

FOREIGN PATENT DOCUMENTS

| | | |
|---|---|---|
| CN | 104599177 B | 1/2018 |
| JP | 2004164253 | 6/2004 |
| JP | 5585195 | 9/2014 |

*Primary Examiner* — Benjamin C Wu
(74) *Attorney, Agent, or Firm* — Nelson and Nelson; Daniel P. Nelson

(57) ABSTRACT

A method includes establishing, for a transaction processing system, a maximum number of transactions that the transaction processing system can optimally handle at a time, as well as an optimal transaction rate. The method monitors a current number of transactions being processed by the transaction processing system. Incoming transactions that would cause the current number to exceed the maximum number are received into a queue, and transactions are released from the queue in accordance with the optimal transaction rate. The method further monitors a number of transactions waiting in the queue. When the number reaches an upper threshold, the method declines to admit additional transactions into the queue. When the number reaches a lower threshold, the method begins to admit additional transactions into the queue. A corresponding system and computer program product are also disclosed.

17 Claims, 7 Drawing Sheets

(56) References Cited

U.S. PATENT DOCUMENTS

| | | | | |
|---|---|---|---|---|
| 2008/0306950 | A1* | 12/2008 | Richards | G06F 16/21 |
| 2011/0078700 | A1* | 3/2011 | Blackburn | G06F 9/505 |
| | | | | 718/105 |
| 2013/0091241 | A1* | 4/2013 | Goetz | H04L 67/325 |
| | | | | 709/217 |
| 2016/0321119 | A1 | 11/2016 | de Lima et al. | |
| 2017/0004097 | A1 | 1/2017 | Lunadier et al. | |
| 2018/0089649 | A1* | 3/2018 | Aoki | G06Q 20/12 |
| 2018/0089703 | A1 | 3/2018 | Aoki et al. | |
| 2018/0089744 | A1* | 3/2018 | Aoki | G06F 9/546 |
| 2018/0165123 | A1* | 6/2018 | Gutierrez | G06F 9/4881 |
| 2018/0309686 | A1* | 10/2018 | Roth | H04L 43/16 |
| 2018/0357291 | A1* | 12/2018 | Choi | G06F 16/2379 |
| 2018/0375784 | A1* | 12/2018 | Balakrishnan | H04L 47/6275 |
| 2019/0342380 | A1* | 11/2019 | Thota | H04L 41/0803 |
| 2020/0028788 | A1* | 1/2020 | Chen | H04L 47/25 |

\* cited by examiner

TRANSACTION OPTIMIZATION DURING PERIODS OF PEAK ACTIVITY

BACKGROUND

Field of the Invention

This invention relates to systems and methods for preventing overloading of transaction processing systems, even during periods of peak activity.

Background of the Invention

In today's digital economy, application performance and availability are increasingly important. As more and more commerce, social interaction, and government interaction moves online, applications are expected to provide high performance and be available around the clock with few if any interruptions. Unfortunately, many systems fail to live up to these high expectations. For example, many transaction processing systems, while functioning well under normal circumstances, may crash, suffer performance issues, or become unreliable during periods of peak activity. This is particularly problematic with transaction processing systems that periodically and customarily receive surges of transaction activity on particular days or times of the year.

For example, when taxes are due, the Internal Revenue Service (IRS) may receive upwards of 120 million tax returns through their online filing system. These tax returns may originate from individuals as well as automated or online tax preparation services. Unfortunately, the IRS transaction processing system is limited in the number of transactions it can effectively and efficiently handle at any particular time. If this number is exceeded, this may cause a crash, congestion, or other performance issues on the transaction processing system. This is likely what occurred in April of 2018, when millions of taxpayers who attempted to file their 2017 tax returns and make payments on the last day possible were denied by a system-wide computer failure that advised last-minute filers to "come back on Dec. 31, 9999."

In view of the foregoing, what are needed are systems and methods to optimize transactions during periods of peak activity. Ideally, such systems and methods will prevent overloading of transaction processing systems even when activity on the transaction processing systems surges. This, in turn, will ideally prevent crashes, congestion, or other performance issues on the transaction processing systems.

SUMMARY

The invention has been developed in response to the present state of the art and, in particular, in response to the problems and needs in the art that have not yet been fully solved by currently available systems and methods. Accordingly, systems and methods have been developed to prevent overloading of transaction processing systems. The features and advantages of the invention will become more fully apparent from the following description and appended claims, or may be learned by practice of the invention as set forth hereinafter.

Consistent with the foregoing, a method to prevent overloading of a transaction processing system is disclosed. In one embodiment, such a method includes establishing, for a transaction processing system, a maximum number of transactions that the transaction processing system can optimally handle at a time, as well as an optimal transaction rate. The method monitors a current number of transactions being processed by the transaction processing system. Incoming transactions that would cause the current number to exceed the maximum number are received into a queue, and transactions are released from the queue in accordance with the optimal transaction rate. The method further monitors a number of transactions waiting in the queue. When the number reaches an upper threshold, the method declines to admit additional transactions into the queue. When the number reaches a lower threshold, the method begins to admit additional transactions into the queue.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
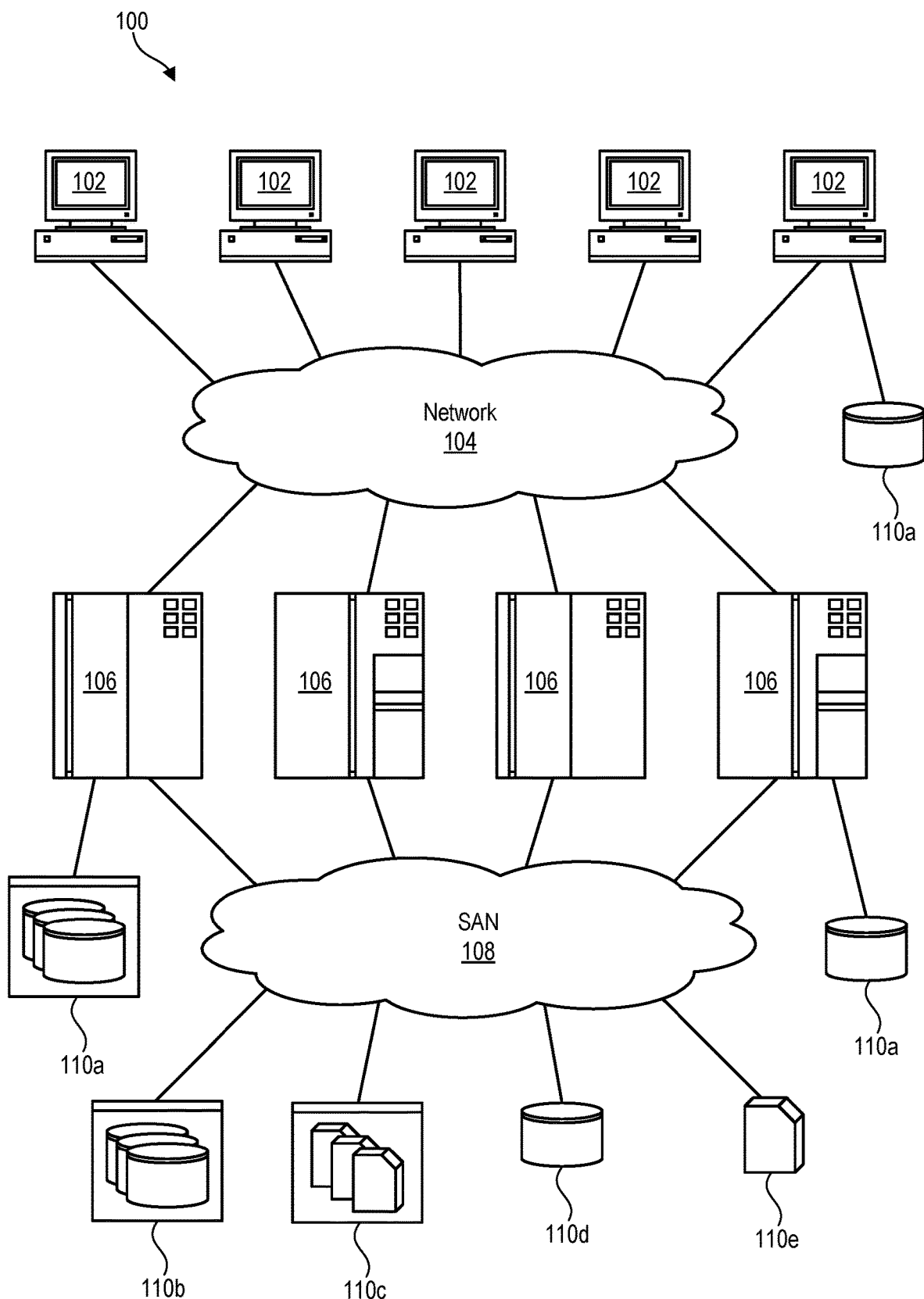
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110*b* of hard-disk drives or solid-state drives, tape libraries 110*c*, individual hard-disk drives 110*d* or solid-state drives 110*d*, tape drives 110*e*, virtual tape systems, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
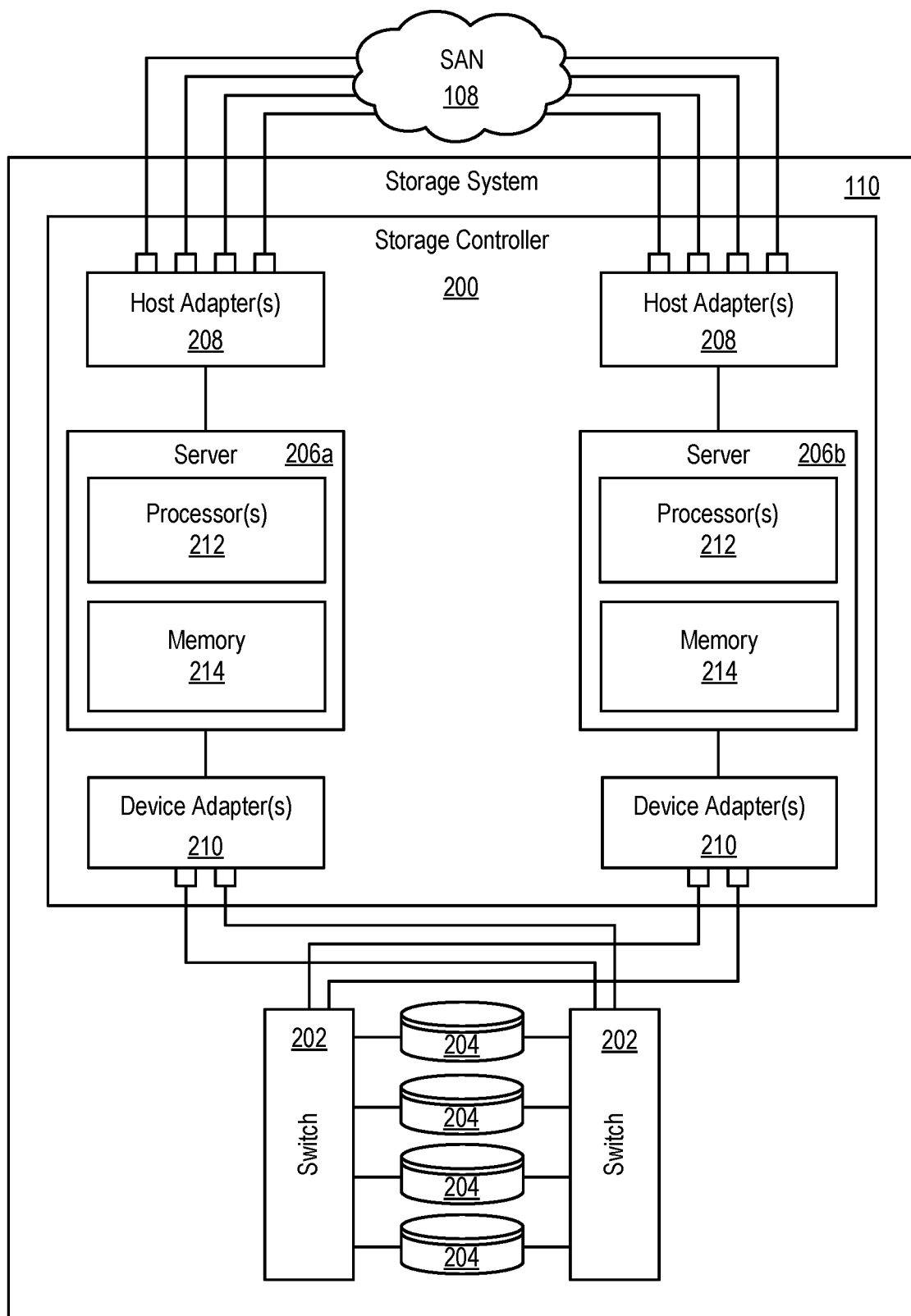
FIG. 2 is a high-level block diagram showing one example of a storage system in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206*a*, 206*b* may provide redundancy to ensure that data is always available to connected hosts 106. Thus, when one server 206*a* fails, the other server 206*b* may pick up the I/O load of the failed server 206*a* to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
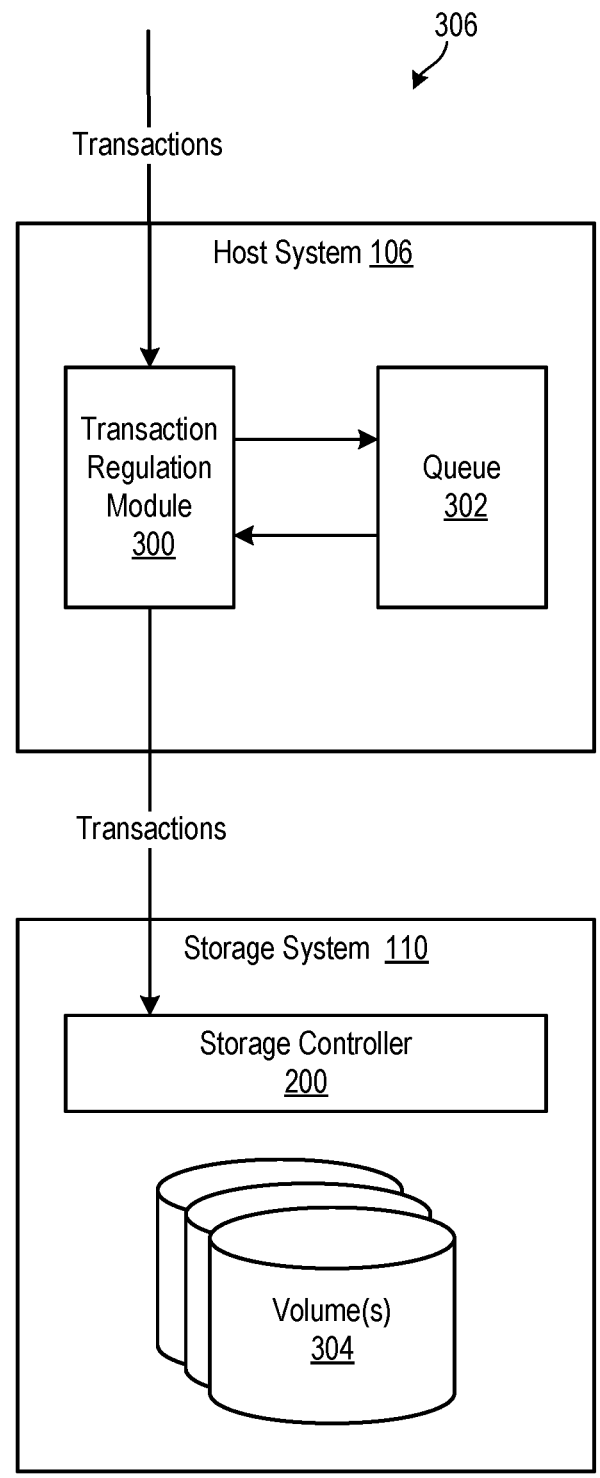
FIG. 3 is a high-level block diagram showing one embodiment of a system to prevent overloading of a transaction processing system.

Referring to FIG. 3, as previously mentioned, in the modern economy, application performance and availability have taken on increasing importance. As more and more commerce, social interaction, and government interaction moves online, applications are expected to provide high performance and be available around the clock with few if any interruptions. Unfortunately, many systems fail to live up to these high expectations. For example, many transaction processing systems, while functioning well under normal circumstances, may crash, suffer performance issues, or become unreliable during periods of peak activity. This is particularly problematic with transaction processing systems that periodically and customarily receive surges of transaction activity on particular days or times of the year.

Thus, systems and methods are needed to optimize transactions during periods of peak activity. Ideally, such systems and methods will prevent overloading of a transaction processing system even when activity on the transaction processing system surges. This ideally will prevent crashes, congestion, or other performance issues on the transaction processing system.

FIG. 3 shows one embodiment of a transaction processing system 306 comprising a host system 106 and storage system 110. As shown, the storage system 110 includes a storage controller 200 configured to store and retrieve data from one or more logical volumes 304. The host system 106 may receive transactions and process these transactions using the connected storage system 110. For the purpose of this disclosure, the term "transaction" may be used to refer to indivisible operations that must succeed or fail as a complete unit, although other definitions of "transaction" are possible and within the scope of the invention.

As previously mentioned, in certain situations, such as during peak processing times, the transaction processing system 306 may receive more transactions than it is able to handle at a particular time. This may overload the transaction processing system 306 and result in crashes, congestion, or other performance issues on the transaction processing system 306.

In order to prevent such overloading of the transaction processing system 306, a transaction regulation module 300 and associated queue 302 may be used to optimize transactions during periods of peak activity. The transaction regulation module 300 and queue 302 will prevent overloading of the transaction processing system 306 even when activity on the transaction processing system 306 surges. This, in turn, will prevent or reduce crashes, congestion, or other performance issues on the transaction processing system 306.

As shown, when the transaction processing system 306 receives more transactions than the transaction processing system 306 can optimally handle at a given time, the transaction regulation module 300 may divert transactions into a queue 302. The transaction regulation module 300 may release transactions from the queue 302 to the transaction processing system 306 at an optimal transaction rate that the transaction processing system 306 can handle. In certain embodiments, the optimal transaction rate is a maximum transaction rate that can be sustained by the transaction processing system 306, with response times that are within a desired range. The manner in which the transaction regulation module 300 and queue 302 are used will be discussed in more detail in association with FIGS. 5 through 7.

In certain embodiments, the transaction regulation module 300 and queue 302 may be implemented outside of the transaction processing system 306. That is, in certain embodiments, the transaction regulation module 300 and associated queue 302 may sit between the transaction processing system 306 and an originator of transactions. Nevertheless, in certain embodiments, the transaction regulation module 300 and associated queue 302 may be implemented on the same host system 106 and/or storage system 110 on which the transaction processing system 306 is implemented. For example, the transaction regulation module 300 and queue 302 may utilize memory and processing resources on the host system 106 and/or storage system 110.

Figure 4:
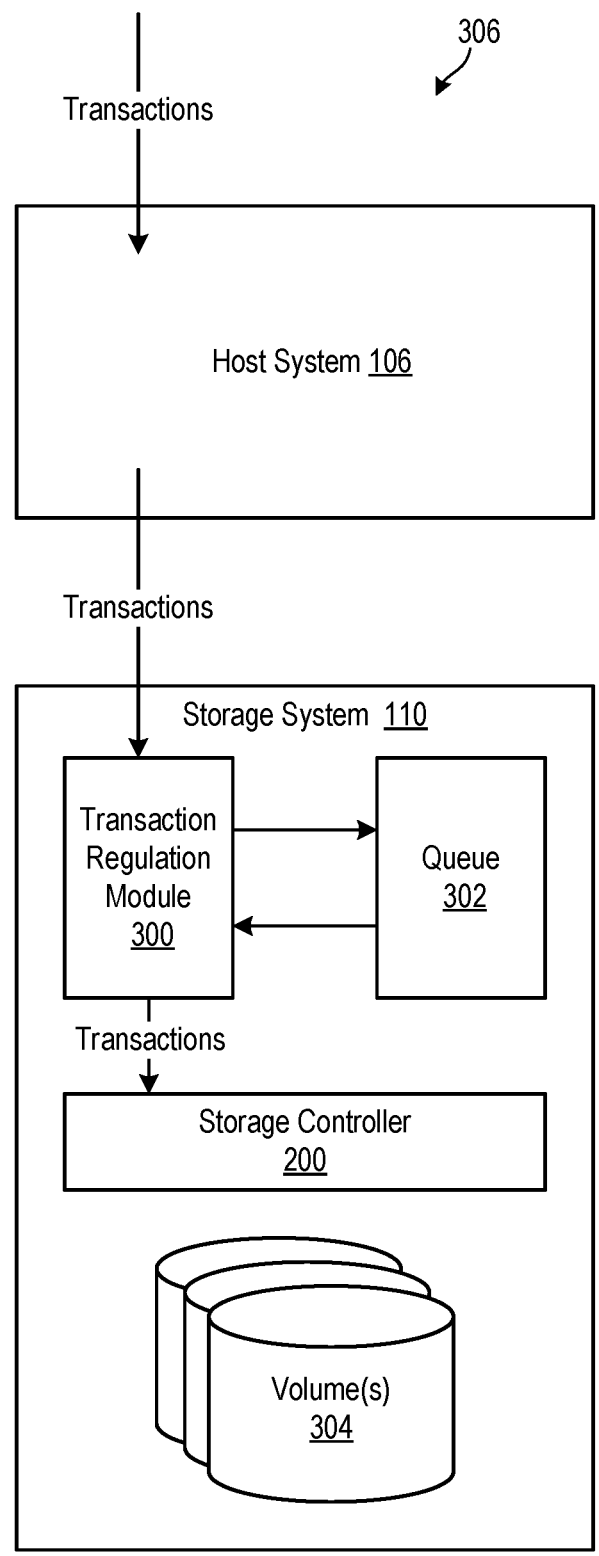
FIG. 4 is a high-level block diagram showing another embodiment of a system to prevent overloading of a transaction processing system.

FIG. 3 shows the transaction regulation module 300 and queue 302 implemented in a host system 106 that is also used in implementing a transaction processing system 306. FIG. 4 shows the transaction regulation module 300 and associated queue 302 implemented in a storage system 110 that is also used in implementing a transaction processing system 306. In either case, the transaction regulation module 300 and queue 302 may regulate the amount of transactions that are passed to the transaction processing system 306. As a result, the transaction regulation module 300 and queue 302 may, in certain embodiments, regulate the number of transactions that are transmitted to a storage controller 200 of a storage system 110.

Figure 5:
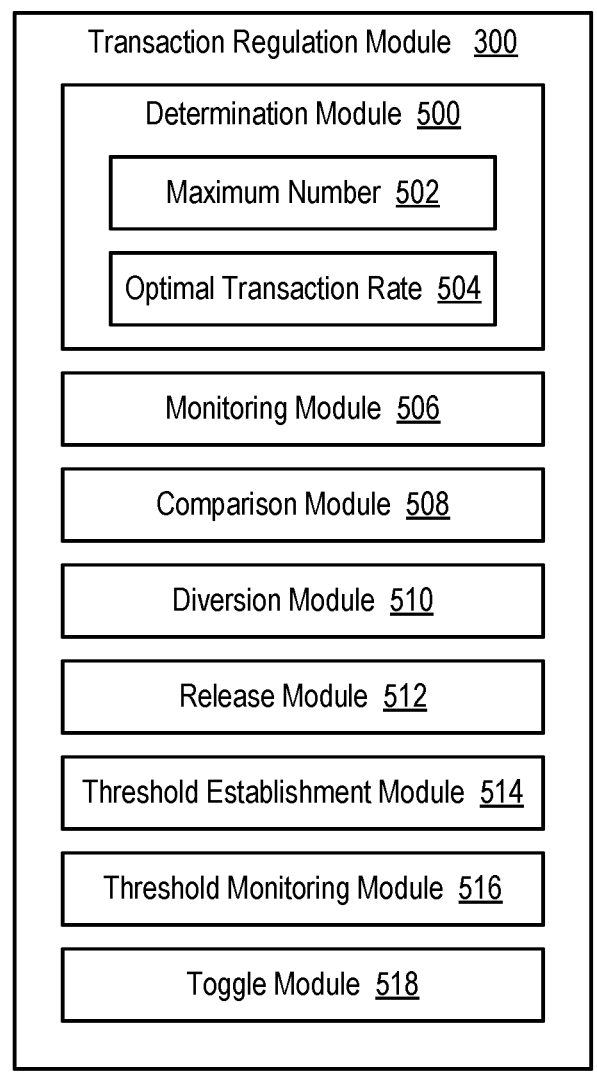
FIG. 5 is a high-level block diagram showing various internal sub-modules within a transaction regulation module in accordance with the invention.

Referring to FIG. 5, a high-level block diagram showing a transaction regulation module 300 and associated sub-modules is illustrated. The transaction regulation module 300 and associated sub-modules may be implemented in hardware, software, firmware, or combinations thereof. The transaction regulation module 300 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the sub-modules within the transaction regulation module 300 may include one or more of a determination module 500, monitoring module 506, comparison module 508, diversion module 510, release module 512, threshold establishment module 514, threshold monitoring module 516, and toggle module 518.

The determination module 500 may be configured to determine various optimal operating parameters for the transaction processing system 306. For example, the determination module 500 may be configured to determine a maximum number 502 of transactions that a transaction processing system 306 can optimally handle at a time, and an optimal transaction rate 504 for feeding transactions to the transaction processing system 306. These parameters 502, 504 may be ascertained by performing performance experiments or testing on the transaction processing system 306, or may correspond to advertised or published parameters or specifications for components (e.g., the host system 106 and/or storage system 110) of the transaction processing system 306.

The monitoring module 506 may monitor a number of transactions currently being handled by the transaction processing system 306, and the comparison module 508 may compare this current number to the maximum number 502. If the current number is equal to or greater than the maximum number 502, the diversion module 510 may divert incoming transactions into the queue 302. In this way, the transaction processing system 306 may not be overloaded beyond its optimal processing capacity. At the same time, the release module 512 may release transactions from the queue 302 to the transaction processing system 306 at or near the optimal transaction rate 504. In certain embodiments, each time the transaction processing system 306 completes x transactions, the release module 512 releases x transactions from the queue 302 to the transaction processing system 306. In this way, the transaction processing system 306 may receive an optimal number of transactions at an optimal rate.

Figure 6:
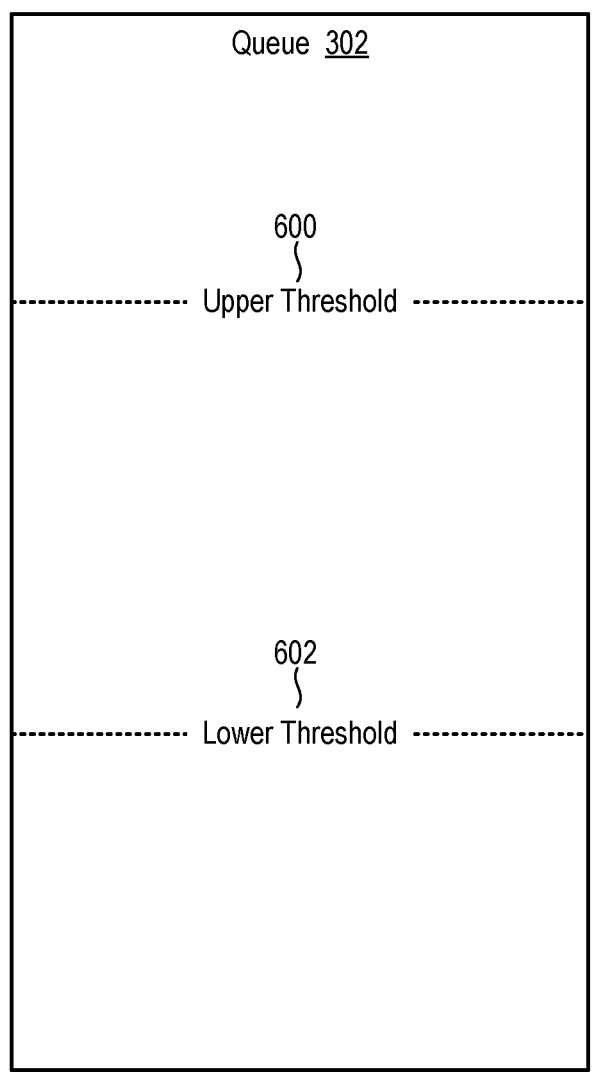
FIG. 6 is a high-level block diagram showing an upper and lower threshold within a queue.

To manage and optimize the number of transactions in the queue 302, the threshold establishment module 514 may establish one or more thresholds for the queue 302. In certain embodiments, these thresholds include an upper threshold 600 and a lower threshold 602, as shown in FIG. 6. In certain embodiments, the thresholds 600, 602 are determined based on the optimal transaction rate 504 and a timeout value. The timeout value may refer to an amount of time a transaction has to complete before it times out and has to be retried. For example, if a timeout value is thirty seconds and an optimal transaction rate 504 is 100K transactions per second, then only three million transactions may be in line for processing before transactions will start timing out. In certain embodiments, the upper threshold 600 may be determined by multiplying the optimal transaction rate 504 by the timeout value. The lower threshold 602, by contrast, may be determined by subtracting some constant (e.g., 100K transactions) from the upper threshold 600.

The threshold monitoring module 516 may monitor the number of transactions in the queue 302. More specifically, the threshold monitoring module 516 may determine when the number of transactions rises to the upper threshold 600 and/or falls to the lower threshold 602. When the number of transactions in the queue 302 rises to the upper threshold 600, the toggle module 518 may turn on a "retry mode." This "retry mode" will decline to admit additional transactions in the queue 302. These transactions will be turned back or rejected so that they can be retried at a later time. Similarly, when the number of transactions in the queue 302 falls to the lower threshold 602, the toggle module 518 will turn off the "retry mode" so that transactions are once again received and admitted into the queue 302. The thresholds 600, 602 may ensure that the queue 302 does not frequently bounce between states where some transactions are accepted while others are rejected.

Figure 7:
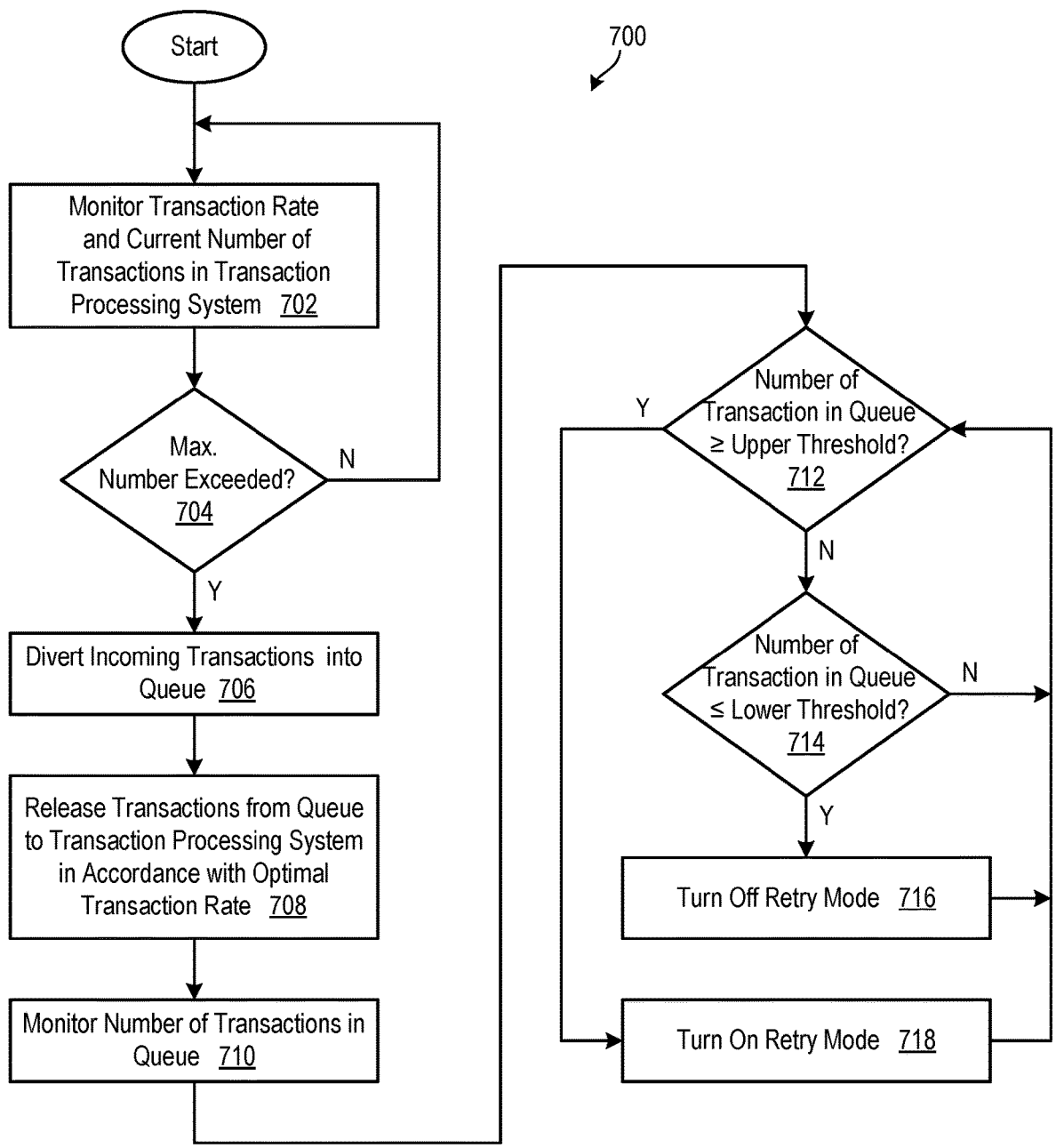
FIG. 7 is a process flow diagram showing one embodiment of a method to prevent overloading of a transaction processing system.

Referring to FIG. 7, one embodiment of a method 700 to prevent overloading of a transaction processing system 306 is illustrated. Such a method 700 may, in certain embodiments, be executed by the transaction regulation module 300 previously discussed. This method 700 is presented by way of example and not limitation. As shown, the method 700 initially monitors 702 a transaction rate and a current number of transactions in a transaction processing system 306. If, at step 704, the current number of transactions in the transaction processing system 306 exceeds a maximum number 502 of transactions that can be optimally handled, the method 700 diverts 706 incoming transactions into a queue 302. The method 700 further releases 708 transactions from the queue 302 to the transaction processing system 306 at an optimal transaction rate 504 associated with the transaction processing system 306.

The method 700 also monitors 710 the number of transactions in the queue 302. If, at step 712, the number of transactions in the queue 302 equals or exceeds an upper threshold 600, the method 700 turns on 718 "retry mode" which prohibits any additional transactions from being admitted to the queue 302. If, at step 714, the number of transactions in the queue 302 equals or falls below a lower threshold 602, the method 700 turns off 716 "retry mode" to once again admit transactions to the queue 302. The method 700 may toggle between the on and off states of the retry mode in accordance with the number of transactions in the queue 302.

The disclosed method 700 is advantageous in that it enables a transaction processing system 306 to process transactions at an optimal rate. During peak activity, the method 700 ensures that the transaction processing system 306 does not become overloaded.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to prevent overloading of a transaction processing system, the method comprising:
   establishing, for a transaction processing system, a maximum number of transactions that the transaction processing system can optimally handle at a time, as well as an optimal transaction rate;
   monitoring a current number of transactions being processed by the transaction processing system;
   when the current number exceeds the maximum number, diverting incoming transactions into a queue;
   releasing transactions from the queue to the transaction processing system in accordance with the optimal transaction rate;
   monitoring a number of transactions waiting in the queue;
   establishing an upper threshold by multiplying the optimal transaction rate by a timeout value associated with the transactions;
   when the number reaches the upper threshold, declining to admit additional transactions into the queue; and
   when the number reaches a lower threshold, admitting additional transactions into the queue.

2. The method of claim 1, wherein declining to admit additional transactions into the queue further comprises returning the additional transactions for retry at a later time.

3. The method of claim 1, wherein the queue resides outside of the transaction processing system.

4. The method of claim 1, wherein the lower threshold is set by subtracting a constant from the upper threshold.

5. The method of claim 1, wherein releasing transactions from the queue to the transaction processing system comprises releasing x transactions from the queue when x transactions are completed by the transaction processing system.

6. The method of claim 1, further comprising determining at least one of the maximum number and the optimal transaction rate by running tests on the transaction processing system.

7. A computer program product to prevent overloading of a transaction processing system, the computer program product comprising a computer-readable storage medium having computer-usable program code embodied therein, the computer-usable program code configured to perform the following when executed by at least one processor:
   establish, for a transaction processing system, a maximum number of transactions that the transaction processing system can optimally handle at a time, as well as an optimal transaction rate;
   monitor a current number of transactions being processed by the transaction processing system;
   when the current number exceeds the maximum number, divert incoming transactions into a queue;
   release transactions from the queue to the transaction processing system in accordance with the optimal transaction rate;
   monitor a number of transactions waiting in the queue;
   establish an upper threshold by multiplying the optimal transaction rate by a timeout value associated with the transactions;
   when the number reaches the upper threshold, decline to admit additional transactions into the queue; and
   when the number reaches a lower threshold, admit additional transactions into the queue.

8. The computer program product of claim 7, wherein declining to admit additional transactions into the queue further comprises returning the additional transactions for retry at a later time.

9. The computer program product of claim 7, wherein the queue resides outside of the transaction processing system.

10. The computer program product of claim 7, wherein the lower threshold is set by subtracting a constant from the upper threshold.

11. The computer program product of claim 7, wherein releasing transactions from the queue to the transaction processing system comprises releasing x transactions from the queue when x transactions are completed by the transaction processing system.

12. The computer program product of claim 7, wherein the computer-usable program code is further configured to determine at least one of the maximum number and the optimal transaction rate by running tests on the transaction processing system.

13. A system to prevent overloading of a transaction processing system, the system comprising:
   at least one processor; and
   at least one memory device operably coupled to the at least one processor and storing instructions for execution on the at least one processor, the instructions causing the at least one processor to:
      establish, for a transaction processing system, a maximum number of transactions that the transaction processing system can optimally handle at a time, as well as an optimal transaction rate;
      monitor a current number of transactions being processed by the transaction processing system;
      when the current number exceeds the maximum number, divert incoming transactions into a queue;
      release transactions from the queue to the transaction processing system in accordance with the optimal transaction rate;
      monitor a number of transactions waiting in the queue;
      establish an upper threshold by multiplying the optimal transaction rate by a timeout value associated with the transactions;
      when the number reaches the upper threshold, decline to admit additional transactions into the queue; and
      when the number reaches a lower threshold, admit additional transactions into the queue.

14. The system of claim 13, wherein declining to admit additional transactions into the queue further comprises returning the additional transactions for retry at a later time.

15. The system of claim 13, wherein the queue resides outside of the transaction processing system.

16. The system of claim 13, wherein the lower threshold is set by subtracting a constant from the upper threshold.

17. The system of claim 13, wherein releasing transactions from the queue to the transaction processing system comprises releasing x transactions from the queue when x transactions are completed by the transaction processing system.

\* \* \* \* \*